Feb. 22, 1966  R. S. WILKES  3,236,399
SILO UNLOADER
Filed March 11, 1964  4 Sheets-Sheet 1

INVENTOR.
R. S. WILKES
BY
William A. Murray
ATTORNEY

Feb. 22, 1966  R. S. WILKES  3,236,399
SILO UNLOADER

Filed March 11, 1964  4 Sheets-Sheet 3

INVENTOR.
R. S. WILKES
BY
William A. Murray
ATTORNEY

Feb. 22, 1966    R. S. WILKES    3,236,399
SILO UNLOADER

Filed March 11, 1964    4 Sheets-Sheet 4

INVENTOR.
R. S. WILKES

BY

*William A. Murray*
ATTORNEY

United States Patent Office 3,236,399
Patented Feb. 22, 1966

3,236,399
SILO UNLOADER
Raymond S. Wilkes, Moline, Ill., assignor to Deere & Company, Moline, Ill., a corporation of Delaware
Filed Mar. 11, 1964, Ser. No. 351,100
10 Claims. (Cl. 214—17)

This invention relates to a silo unloader adapted to move material from the surface of the material contained in a silo and to discharge the material out one side of the silo. Still more particularly this invention relates to a drive mechanism for operating to move the unloader over the surface of the silo. Even still more particularly this invention relates to a leveling mechanism associated with the silo unloader for maintaining the surface of the silage relatively level.

It is a primary object of the present invention to provide a new and novel structure for driving the silo unloader over the surface of the silage. Included as part of the structure is an upright material receiving chamber at the center of the silo fixed against rotation. Operating in conjunction with the chamber is a radial sweep adapted to move over the surface of the silage and convey material inwardly to the chamber. Drive mechanism is provided adjacent the chamber and operates to drive a sprocket on the sweep spaced radially from the chamber. The sprocket is drivingly connected to a sprocket fixed against rotation on the surface of the chamber so that as the chain interconnecting the two sprockets rotates due to the rotation of the drive sprocket, it will effect driving of the sweep angularly about the chamber.

A further object of the present invention is to provide on the outer end of the sweep a leveling system consisting of two lower wheels engaging the silo walls and an upper wheel offset inwardly a small distance from the silo wall and inclined upwardly in the direction of movement of the sweep. In operation should the silage become low on one side of the silo, the entire sweep will be inclined downwardly and the upper wheel will contact the silo wall and, being inclined, it will tend to drive the sweep mechanism upwardly and out of contact with the silage. Consequently when the sweep moves into an area where the silage is low, the leveling system will automatically operate to prevent or minimize the cut or removal of silage. Incorporated with the self-leveling system is a diametrical extension of the sweep mechanism extending across the silo and having at its outer end a pressure device maintaining the leveling wheel mechanism under pressure and in engagement with the silo wall.

Other objects and advantages of the present invention will become apparent to those skilled in the art as the nature of the invention is better understood from the following description and as shown in the accompanying drawings.

Figure 1:
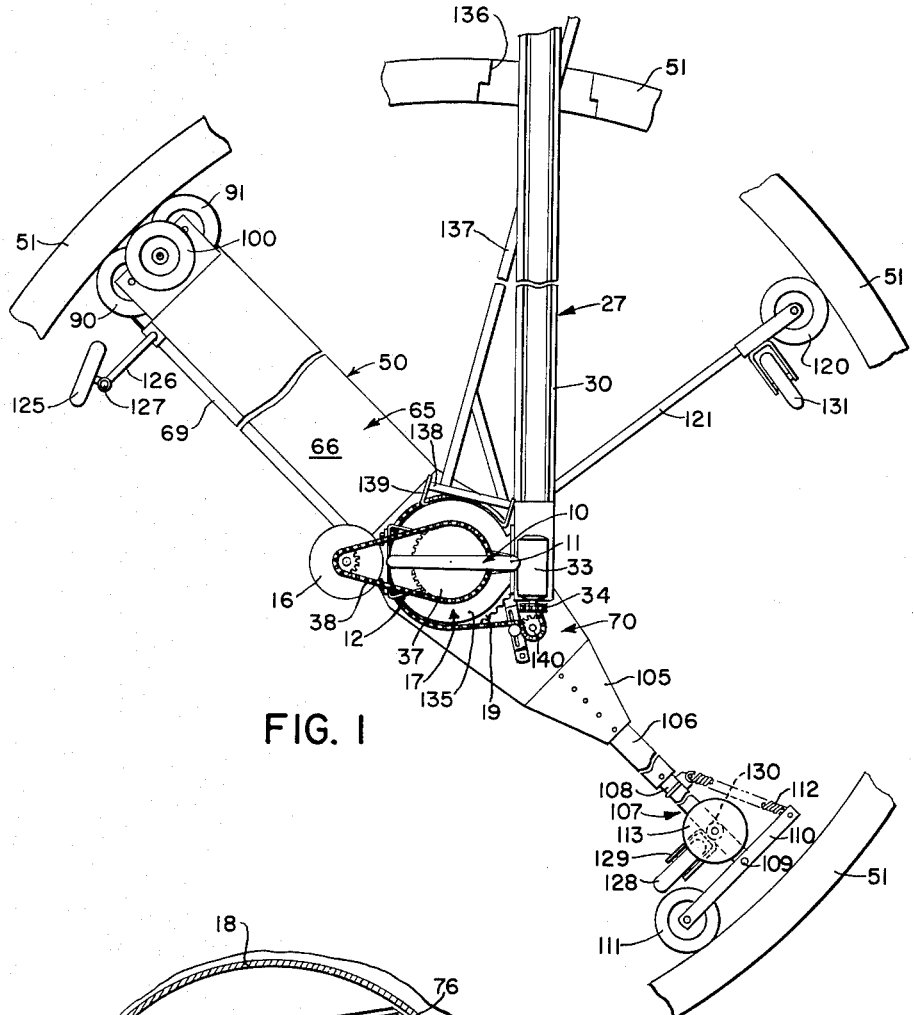
FIG. 1 is a plan view of the entire silo unloader with portions of the silo unloader removed.
Figure 7:
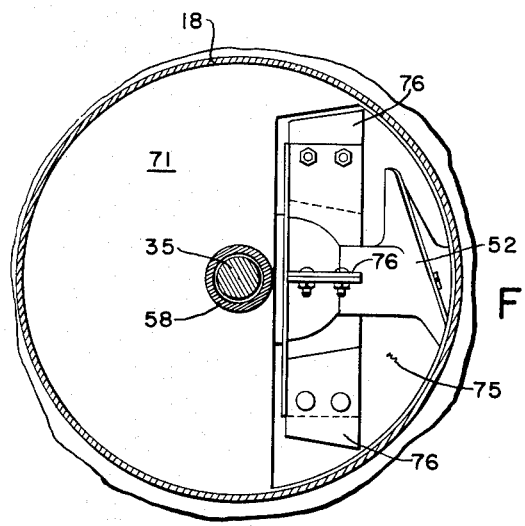
FIG. 7 is a sectional view taken substantially along the line 7—7 of FIG. 3.

The silo unloader is of the type disposed on the surface of the silage and adapted to move over the surface and remove a top layer of silage. As is conventional, such a silo unloader is normally supported from the top of the silo by a cable, not shown, that extends downwardly and is connected to a main support, indicated in its entirety by the reference numeral 10, disposed centrally in the silo. The upright support is composed in part of a U-shaped main member 11 directed downwardly and connected at its lower ends to a triangular shaped structure 12 having an overhead plate 13 supporting an upper journal 14 and an outer upright plate structure 15 serving as the support for the main power source, in the present instance an electric motor 16. Welded to the lower edges of the triangular shaped structure 12 is a downwardly opening material receiving chamber 17 having an annular upright wall 18 and an overhead wall 19 supporting a centrally located journal 20. The journals 14, 20 are carried in an upright journal housing 21 extending through the overhead walls 13, 19. The chamber 17 has a material discharge opening 25 at one side thereof with a round plate or flange 26 surrounding the opening 25 and serving as a horizontal pivot member for an auger type conveyor 27. The auger conveyor 27 has an intake end receiving material directly from the opening 25 and includes a housing 30 enclosing an auger 31 and connected to the flange 26 by means of an overlapping lip 32 extending over the rounded edge of the flange 26 and completing with the flange 26 a horizontal pivot permitting the entire conveyor 27 to move vertically. A separate electric motor 33 is supported on the top surface of the housing 30 and drives the auger 31 by a chain drive 34.

Figure 2:
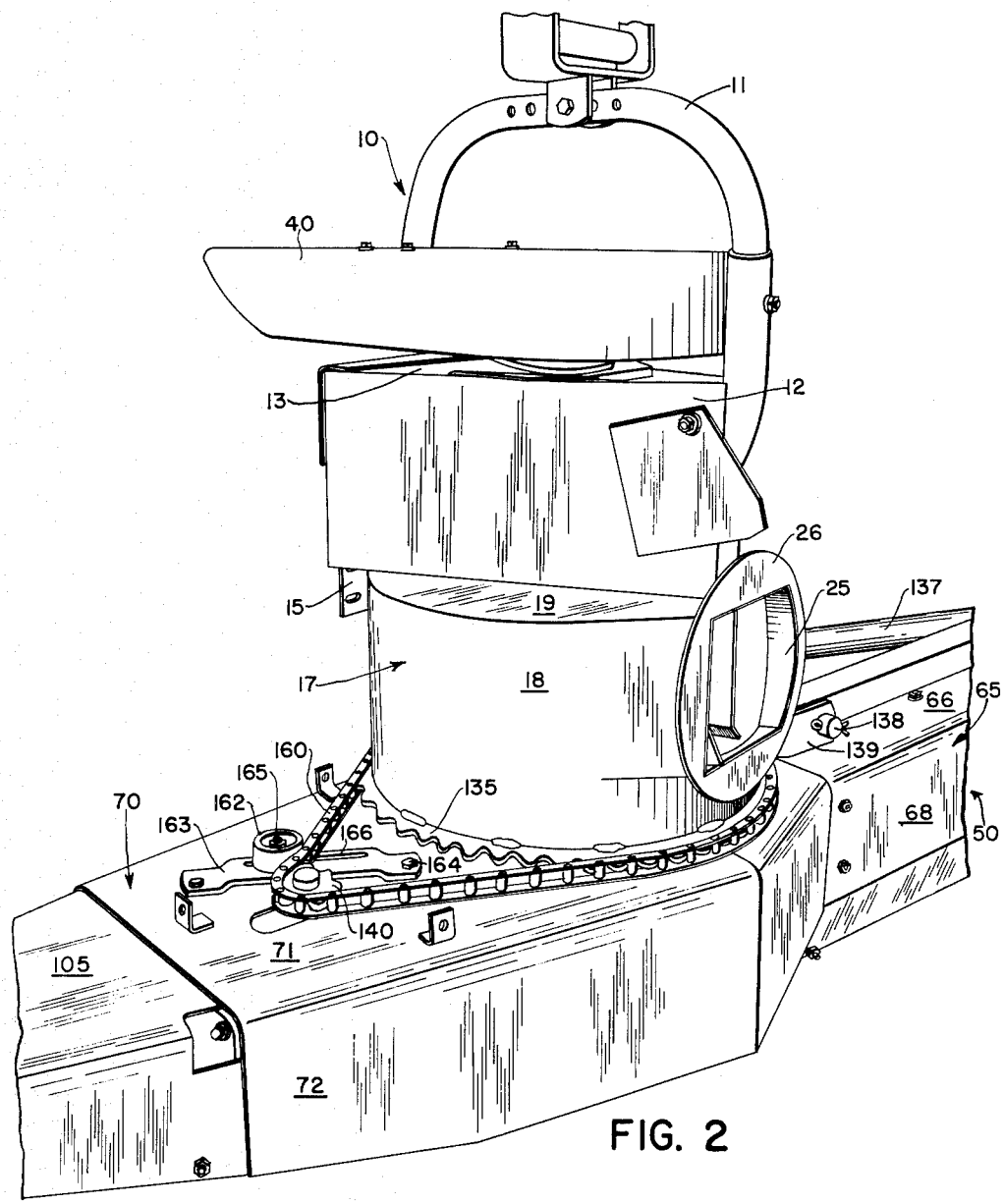
FIG. 2 is a side perspective view of the center portion of the silo unloader.
Figures 3, 4:
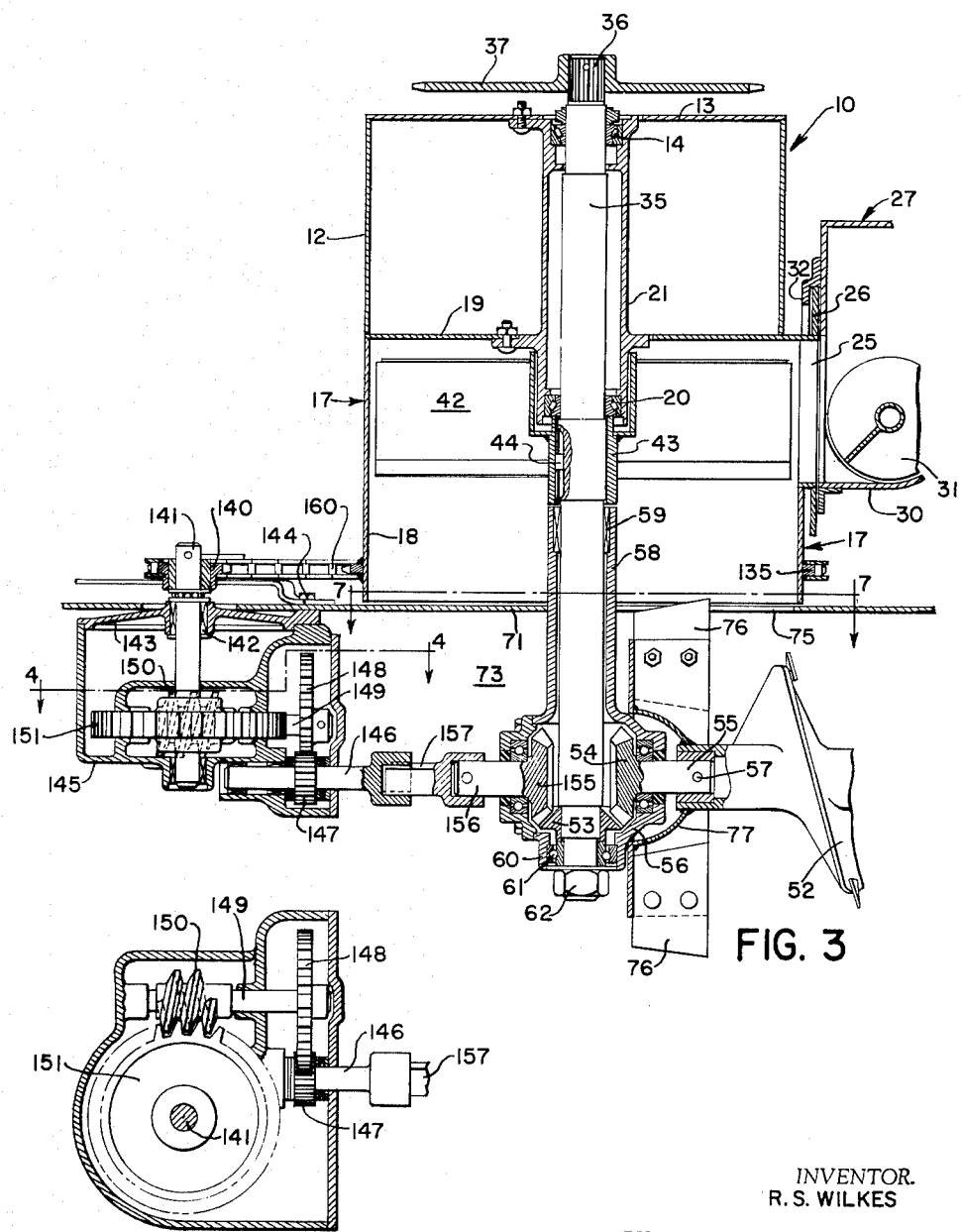
FIG. 3 is a vertical sectional view through the center portion of the silo unloader.
FIG. 4 is a sectional view taken substantially along the line 4—4 of FIG. 3.

An upright shaft 35 is rotatably carried by the journals 14, 20 and has its upper end projecting above the overhead panel 13 and splined at 36 to a horizontal sprocket 37 connected by a chain drive 38 to the electric motor 16. A suitable shield 40, shown only in FIG. 2, is provided over the chain drive. Impeller blades 42 are disposed in the chamber 17 and have a common central hub portion 43 keyed, as at 44, to the shaft 34. The impeller blades 42 operate to move material through the opening 25 and into the contact with the auger 31.

The sweep structure, indicated in its entirety by the reference numeral 50 extends diametrically across the silo and contacts at its opposite ends the silo wall 51. The sweep structure 50 is composed in part of an auger 52 extending from an inner end adjacent the lower end of the main drive shaft 35 to an outer end closely adjacent the silo wall 51. The inner end of the auger 52 is drivingly connected to the lower end of the shaft 35 by bevel gears 53, 54 connected respectively to the shaft 35 and to a short stub shaft 55 extending horizontally outwardly of a gear housing 56. The outer end of the shaft 55 is connected to the central auger 52 by means of a pin 57. The gear housing 56 has an upper vertically disposed neck portion 58 concentric with the shaft 35 extending upwardly to a point adjacent the lower edge of the impeller hub 43. Internal bearings 59, 61 permit the portion 58 to rotate on the lower end of the shaft 35. The housing 56 also includes a lower downwardly projecting portion 60 having an internal bearing 61 engaging the extreme lower end of the shaft 35. The lower end of the shaft 35 is threaded to receive a nut 62 for retaining the entire housing 56 on the shaft 35. However, the bearings 59, 61 permit the entire housing 56 to rotate relative to the shaft 35 and consequently permit the entire auger to sweep angularly over the silage and about the inner end of the auger.

Besides the auger 52, the sweep structure 50 includes a U-shaped housing 65 inverted to open downwardly and to cover the auger 52. The housing 65 includes a laterally disposed overhead panel 66, a leading vertical panel 67 and a vertical trailing panel 68. Outer extensions 66', 67' and 68' are provided on the end of the housing 65. The lower edge portions of the panels 67, 67' are turned upwardly as at 69, 69' to expose the lower half of the auger 52. The trailing panels 68, 68' extend downwardly to substantially the lower edge of the auger 52. The housing structure includes a central portion 70 having an overhead panel 71 and depending vertical panels 72, 73 forming continuations of the outer housing 65 and the respective panels. The overhead panel 71 extends beneath, but closely adjacent the lower edges of the chamber 18 and has an upwardly extending opening 75 offset to one side of the shaft 35 and adjacent the inner end of the auger 52. Directly beneath the opening 75 is provided on the inner end of the central shaft portion of the auger 52 radially extending flexible flipper elements 76 bolted to a cast hub 77 welded to the auger 52. The flipper elements 76 operate to move material upwardly through the opening 75.

Figure 5:
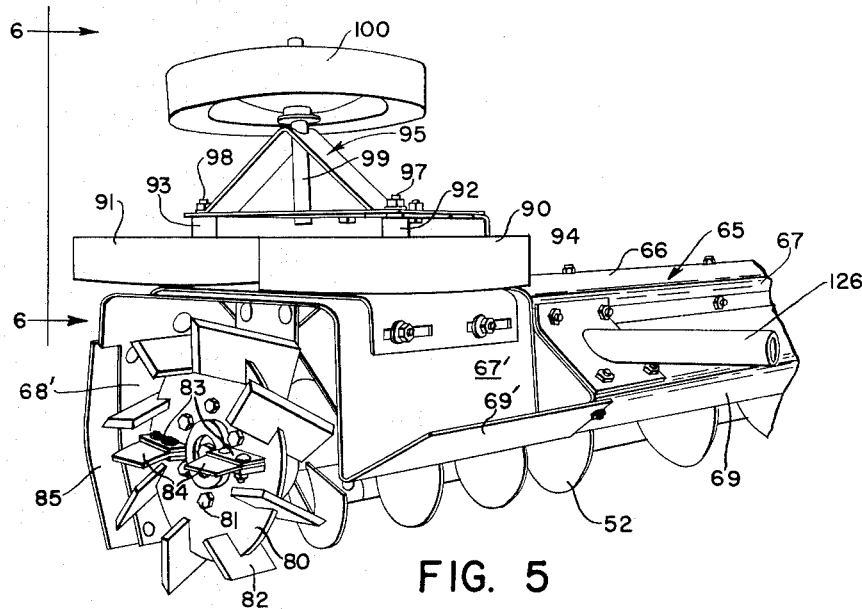
FIG. 5 is a side perspective view of the outer end of the sweep.
Figure 6:
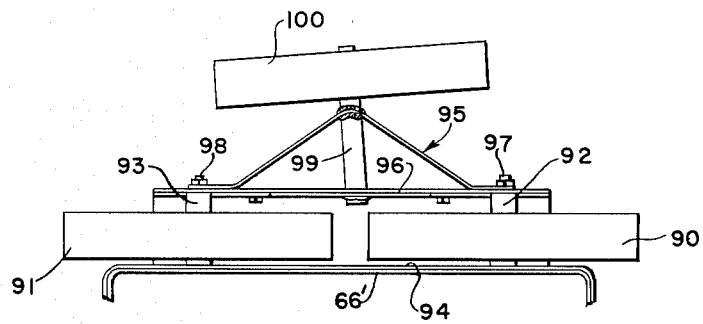
FIG. 6 is an end view of the upper portion of the sweep of the silo unloader as taken substantially along the line 6—6 of FIG. 5.

Referring now to FIG. 5, the outer end of the auger 52 is provided with a wall-scraping device composed in part of a vertical plate 80 bolted, as at 81, to rotate in unison with the auger 52 and having axially extending scraper blades 82 fixed to the outer surface of the plate 80 and projecting toward and in close proximity to the wall of the silo. Fixed to outwardly projecting brackets 83 projecting from the face of the plate 80 are flexible brush elements 84 projecting beyond the scraper edges of the scraper elements 82 and normally engaging the wall of the silo. The flexible brushes may be made of any of a series of flexible elements, tire carcasses being ideally suited for such use. The scraping device operates to utilize the blade elements 82 for chipping frozen and packed silage and other material away from the wall. However, in many instances silage will be retained on the wall even after chipping occurs and it is the purpose of the brushes 84 to brush the relatively loosely held silage from the wall. As a further aid in brushing material from the wall is a rubber extension 85 projecting from the rear housing panel 68' and contacting the wall.

Also located at the outer end of the sweep structure 50 is a leveling device composed of a pair of horizontally disposed guide wheels 90, 91 rotatably carried on upright shafts 92, 93 respectively projecting upwardly from the upper horizontal panel extension 66'. Suitable reinforcing, such as a plate 94, overlies the panel extension 66' for the purpose of adding structural rigidity at that end of the structure. The shafts 92, 93 are interconnected by an A-frame 95 having horizontally disposed plate structure 96 extending between and directly connected to the shafts 92, 93 by means of nuts 97, 98. An inclined wheel shaft 99 extends through the apex portion of the A-frame 95 and the interconnecting plate portion 96 at the base of the A-frame. The shaft 99 is inclined in a trailing direction and supports at its upper end a third or vertically offset wheel 100. The two wheels 91, 92 normally engage the wall 51 of the silo and the upper wheel is offset slightly away from the wall 51. However, should the radial structure dip or tilt downwardly at its lower end, the upper wheel 100 will engage the wall and due to its inclination tend to track upwardly to thereby raise the outer end of the radial structure. This type of leveling system is automatic since upon the radial structure and particularly the auger 52 passing a low side or dip in the silage, the outer end of the auger will dip downwardly to cause the wheel 100 to engage the wall and drive the auger 52 upwardly and out of contact with or to reduce the depth of cut of the silage. Consequently at the location or spots in the silo where the silage is low, a leveling system consisting of the three wheels 91, 92 and 100 will tend to prevent surface removal of material by the auger 52.

The central housing portion 70 tapers inwardly, as at 105, and is connected to an outer beam extension 106 telescopingly receiving a pressure structure, indicated in its entirety by the reference numeral 107. The unit 107 is composed in part of a radial beam member 108 projecting from the extension 106 and pivotally connected at 109 at its outer end to an arm 110 having a pressure wheel 111 connected at one end. The arm 110 has a spring 112 connected to its opposite end and extending from that end to an inner portion of the beam member 108. The beam 108 also carries a weight, indicated at 113, for maintaining balance of the entire sweep structure 50. As is obvious, the spring 112 maintains the wheel 111 in contact with the wall 51 and also retains a similar pressure between the wheels 91, 92 and the wall 51.

A third guide wheel 120 is supported on an arm 121 projecting from the central upright structure substantially at 90° from the wheels 90, 91 and 111. While the pressure wheel 111 maintains pressure between the wheels 90, 91 and the wall 51, the wheel 120 through its arm 121 serves primarily the purpose of retaining the chamber 18 and the entire upright supporting structure 10 substantially at the center of the silo.

Provided on the sweep structure 50 and adjacent the outer end of the auger portion of the sweep structure is a gauge wheel 125 carried on a rigid arm 126 that projects in advance of the sweep structure 50. The wheel 125 is mounted by means 127 on the end of the arm 126. The wheel 125 supports the auger portion of the sweep structure 50 in a manner that the lip 69 and lip extension 69' are positioned several inches above the surface of the silage and prevents gouging or dipping of the leading edge of the auger portion into the silage.

Supported on the arm portion 108 at substantially 180° from the previous gauge wheel is a second gauge wheel 128 supported, as at 130, to an arm 129. Similarly, adjacent the wheel 120 and supported on caster means, not shown, but retained on the outer end of the arm 121 is a third gauge wheel 131. It should be recognized that the wheels 125, 128 and 131 primarily serve to prevent radial structures and the guide wheels 91, 92, 111 and 120 from engaging the surface of the silage and thereby retaining them for theim primary purpose which is to engage the wall 51.

The entire sweep structure 50 is moved about the surface of the silage by a method considered unique in the present invention. Supported on the chamber wall 18 and externally thereof is an annular sprocket member 135. The sprocket 135 as well as the chamber 18 is generally held against rotation partially by the conveyor structure 27 that extends through the side opening 136 in the silo wall 51 and partially by a torque arm 137 pivotally carried on horizontal pivot means 138 supported on bracket structure 139 welded to the outer face of the chamber 18. Both the conveyor 27 and the torque arm 137 will engage the edge of the opening 136 and will, of course, lock the chamber 18 against rotation about the upright shaft 35.

Radially spaced from the sprocket 135 and substantially on the same level is a drive sprocket 140 fixed to an upright vertical shaft 141 journaled at 142 to a bearing support 143. The support 143 is bolted at 144 to the overhead panel 71. The support 143 also serves as a cap for a gear housing, indicated in its entirety by the reference numeral 145.

The vertical shaft 141 is driven by a horizontal input shaft 146 through a series of speed reducing gears including a pair of spur gears 147, 148, the latter being fixed to a countershaft 149 carrying a worm gear 150. The worm gear 150 meshes with a gear 151 fixed to the upright shaft 141. The entire speed reducing gear cluster is contained in the housing 145.

The input shaft 146 is connected to the vertical main drive shaft 35 by means of a bevel gear 155 having a stub shaft 156, the latter being connected to the shaft 146 by means of a coupling, indicated in its entirety by the reference numeral 157. The bevel gear 155 meshes with the lower horizontal bevel gear 53 fixed to the vertical drive shaft 35. It therefore becomes apparent that upon power being delivered to the vertical drive shaft 35 the auger structure 52 will rotate and power will be transmitted to the drive sprocket 140. The drive sprocket 140 is connected to the fixed sprocket 135 on the chamber 17 by means of a continuous flexible element or chain 160. Since the sprocket 135 is fixed against rotation, as the sprocket 140 is driven the entire sweep structure 150 will be driven angularly about the axis of the shaft 35 and over the surface of the silage. A take-up idler 162 is supported on the surface 71 of the central housing structure by means of a bracket 163 bolted at 164 to the panel 71. The idler wheel 162 engages the back of the chain 160. It is bolted to the bracket 163 by a bolt 165 extending through a slot 166 and consequently is capable of being shifted along the slot for purposes of take-up in the chain 160.

In operation the silo unloader moves silage by augering the material by the auger 52 inwardly as the entire structure 50 sweeps over the surface of the silage. The flipper 76 receives the silage from the auger 52 and moves it upwardly through the opening 75 and into the path of the impeller blades 42. The impeller blades 42 move the material through the side opening 25 and into contact with the discharge auger 31. The discharge auger 31 moves it through the side opening 136. The flipper blade 76 and impeller blade 42 do in fact operate as impeller means for moving the silage from the inner end of the auger 52 and into the auger 31. The portion of the overhead panel 71 disposed under the open side of the chamber 17 will operate as a shelf to receive the material and retain the material from gravitating back into the underside of the chamber. A small buildup of material will not affect the efficient operation of the structure and does in fact operate as a place or location to build up material so that should excess silage be moved into the chamber, there will be a place for it to move without creating a clogging condition within the chamber.

While only one form of the invention has been shown, it should be recognized that other forms and variations will occur to those skilled in the art. Therefore while the present form has been shown and described in concise and detailed manner for the purpose of clearly and concisely illustrating the principles of the invention, it should be understood that there is no intention to limit or narrow the invention beyond the broad concepts set forth in the appended claims.

What is claimed is:

1. A silo unloader for use within an upright silo wall comprising: an upright support centrally located in the silo and including wall structure defining an upright material receiving chamber; radial sweep structure extending from the chamber to the wall and adapted to move material from the surface of the silage inwardly to the chamber; means connecting the sweep structure to the support permitting rotation of the sweep structure relative to the support; means extending from the chamber to the wall for preventing rotation of the chamber; a first sprocket fixed to the outer surface of the chamber; a second sprocket journaled on the sweep structure in radially spaced relation to the chamber; a chain carried on the sprockets; a power source; and drive means drivingly connecting the power source to the second sprocket for effecting rotation of the second sprocket.

2. A silo unloader for use within an upright silo wall comprising: an upright support centrally located in the silo and including wall structure defining an upright material receiving chamber; radial sweep structure extending from the chamber to the wall and adapted to move material from the surface of the silage inwardly to the chamber; means connecting the sweep structure to the support permitting rotation of the sweep structure relative to the support; means extending from the support to the wall for preventing rotation of the support; a first element-receiving member fixed to the support; a second element-receiving member journaled on the sweep structure in radially spaced relation to the support; a continuous flexible element extending around the element-receiving members; a power source; and drive means drivingly connecting the power source to the second element-receiving member for effecting rotation thereof.

3. A silo unloader for use within an upright silo wall comprising: an upright support centrally located in the silo and including wall structure defining an upright material receiving chamber; radial sweep structure extending from the chamber to an outer end adjacent the wall and adapted to move material from the surface of the silage inwardly to the chamber; means connecting the sweep structure to the supporting permitting rotation of the sweep structure relative to the support; means extending from the chamber to the wall for preventing rotation of the chamber; a first sprocket fixed to the outer surface of the chamber; a second sprocket journaled on the sweep structure in radially spaced relation to the chamber; a chain carried on the sprockets; a power source; drive means drivingly connecting the power source to the second sprocket for effecting rotation of the second sprocket; upper and lower wheels supported on the outer end of the sweep structure in vertically spaced relation, the lower of the wheels normally engaging the silo wall and the upper of the wheels being normally offset inwardly from the wall and engageable with the wall upon downward tilting of the radial structure, and being inclined upwardly in respect to direction of travel whereby as the upper of the wheels engage the wall of the outer end of the radial structure will tend to rise.

4. A silo unloader for use within an upright silo wall comprising: an upright support centrally located in the silo and including wall structure defining a material receiving chamber; sweep structure extending across the silo between opposite wall-proximate ends and adapted to move material from the surface of the silage inwardly to the chamber; a power source supported by the support; drive means extending from the power source to the sweep structure for effecting movement of the sweep structure over the silage; upper and lower wheels supported on one of the outer ends of the sweep structure in vertically spaced relation, the lower of the wheels normally engaging the silo wall and the upper of the wheels being normally offset inwardly from the wall and engageable with the wall only upon downward tilting of the radial structure, and being inclined upwardly in respect to direction of travel whereby as the upper of the wheels engage the wall the outer end of the radial structure will tend to rise; and means on the sweep structure between its opposite ends for maintaining pressure between the wheels and the silo wall.

5. A silo unloader for use within an upright silo wall comprising: an upright support centrally located in the silo and including wall structure defining an upright material receiving chamber; radial sweep structure extending from the chamber to an outer end adjacent the wall and adapted to move material from the surface of the silage inwardly to the chamber; means connecting the sweep structure to the support permitting rotation of the sweep structure relative to the support; means extending from the chamber to the wall for preventing rotation of the chamber; a first annular element-receiving member fixed to the support; a second annular element-receiving member journaled on the sweep structure in radially spaced relation to the chamber; an endless flexible element carried on the element-receiving members, a power source; drive means drivingly connecting the power source to the second member for effecting rotation of the second member; upper and lower wheels supported on the outer end of the sweep structure in vertically spaced relation, one of the wheels normally engaging the silo wall and the other of the wheels being normally offset inwardly from the wall and engageable with the wall upon tilting of the radial structure, and being inclined in respect to the direction of travel whereby as said other of the wheels engage the wall the outer end of the radial structure will tend to adjust vertically.

6. A silo unloader for use within an upright silo wall comprising: an upright support centrally located in the silo and including wall structure defining an upright material receiving chamber; sweep structure extending across the silo between opposite wall-proximate ends and adapted to move material from the surface of the silage inwardly to the chamber; a power source supported by the support; drive means extending from the power source to the sweep structure for effecting movement thereof over the silage; upper and lower wheels supported on one of the ends of the sweep structure in vertically spaced relation, one of the wheels normally engaging the silo wall and the other of the wheels being normally offset inwardly from the wall and engageable with the wall only upon tilting of the radial structure, and being inclined in respect to direction of travel whereby as said other of the wheels engage the wall the outer end of the radial structure will tend to adjust vertically; and means on the sweep structure between its opposite ends for maintaining pressure between the wheels and the silo wall.

7. A silo unloader for use within an upright silo wall having a side discharge opening comprising: an upright drive shaft centrally located in the silo; wall structure around the shaft defining an upright and downwardly opening material receiving chamber; a radial auger structure extending from the chamber to the wall and adapted to move material from the surface of the silage inwardly to the underside of the chamber; conveyor means extending from the chamber to the side discharge opening; impeller means drivingly connected to the shaft for impelling the material from the inner end of the auger structure upwardly to the conveyor means; drive means connecting the auger structure to the shaft permitting rotation of the auger structure relative to the shaft; means extending from the chamber to the wall for preventing rotation of the chamber; a first sprocket fixed to the outer surface of the chamber; a second sprocket journaled on the auger structure in radially spaced relation to the chamber; a chain carried on the sprockets; a power source for rotating the shaft; and drive means extending from the shaft to the second sprocket for effecting rotation of the second sprocket.

8. A silo unloader for use within an upright silo wall comprising: an upright support centrally located in the silo and including an upright drive shaft and an upright wall structure formed about the shaft defining a downwardly opening upright material receiving chamber with lower peripheral edges; sweep structure extending diametrically across the silo including an auger having an inner end drivingly connected to the shaft and at the center of the silo and an outer end adjacent the wall, the sweep structure being adapted to move material from the surface of the silage inwardly beneath the chamber, the sweep structure further including a downwardly opening U-shaped housing means overlying the auger with a laterally disposed overlying panel extending under the chamber in relatively close relation to the peripheral edges, the panel further having a material opening for passing material upwardly into the chamber; an impeller supported on the shaft adapted for rotation about a vertical axis, means extending from the chamber to the wall for preventing rotation of the chamber; a conveying means opening into the side of the chamber for receiving material from the impeller and extending therefrom through the silo wall; a first sprocket fixed to the outer surface of the chamber; a second sprocket supported on the sweep structure in radially spaced relation to the chamber and on the opposite side of the upright shaft than the auger; a chain carried on the sprockets; and a power transmission extending from the lower end of the upright shaft to the second sprocket for effecting rotation of the second sprocket, said transmission being disposed beneath the U-shaped housing means.

9. A silo unloader for use within an upright silo wall comprising: an upright support centrally located in the silo and including an upright drive shaft and an upright wall structure formed about the shaft defining a downwardly opening upright material receiving chamber with lower peripheral edges; sweep structure extending diametrically across the silo including a sweep conveyor having an inner end drivingly connected to the shaft and at the center of the silo and an outer end adjacent the wall, the sweep structure being adapted to move material from the surface of the silage inwardly beneath the chamber, the sweep structure further including a downwardly opening housing means overlying the sweep conveyor with a laterally disposed overlying panel beneath the chamber, the panel further having a material opening for passing material upwardly into the chamber; means extending from the chamber to the wall for preventing rotation of the chamber; a conveying means opening into the chamber for receiving material therefrom and extending therefrom through the silo wall; a first sprocket fixed to the outer surface of the chamber; a second sprocket supported on the sweep structure in radially spaced relation to the chamber and on the opposite side of the upright shaft than the sweep conveyor; a chain carried on the sprockets; and a power transmission extending from the upright shaft to the second sprocket for effecting rotation of the second sprocket, said transmission being disposed beneath the housing means.

10. A silo unloader for use within an upright silo wall comprising: an upright support centrally located in the silo and including an upright drive shaft and an upright wall structure formed about the shaft defining a downwardly opening upright material receiving chamber; sweep structure extending across the silo between opposite wall-engaging ends and including a sweep conveyor having an inner end drivingly connected to the shaft and at the center of the silo and an outer end adjacent the wall, the sweep structure being adapted to move material from the surface of the silage inwardly beneath the chamber; means extending from the chamber to the wall for preventing rotation of the chamber; a conveying means opening into the chamber for receiving material therefrom and extending therefrom to an outer end adjacent the silo wall; a first sprocket fixed to the chamber and substantially concentric with the shaft; a second sprocket supported on the sweep structure in radially spaced relation to the chamber and on the opposite side of the upright shaft than the sweep conveyor; a chain carried on the sprockets; and a power transmission extending from the lower end of the upright shaft to the second sprocket for effecting rotation of the second sprocket.

References Cited by the Examiner
UNITED STATES PATENTS

| 3,079,016 | 2/1963 | Dretzke | 214—17 |
| 3,144,144 | 8/1964 | Sime | 214—17 |

GERALD M. FORLENZA, *Primary Examiner.*

HUGO O. SCHULTZ, *Examiner.*